Figure 1:
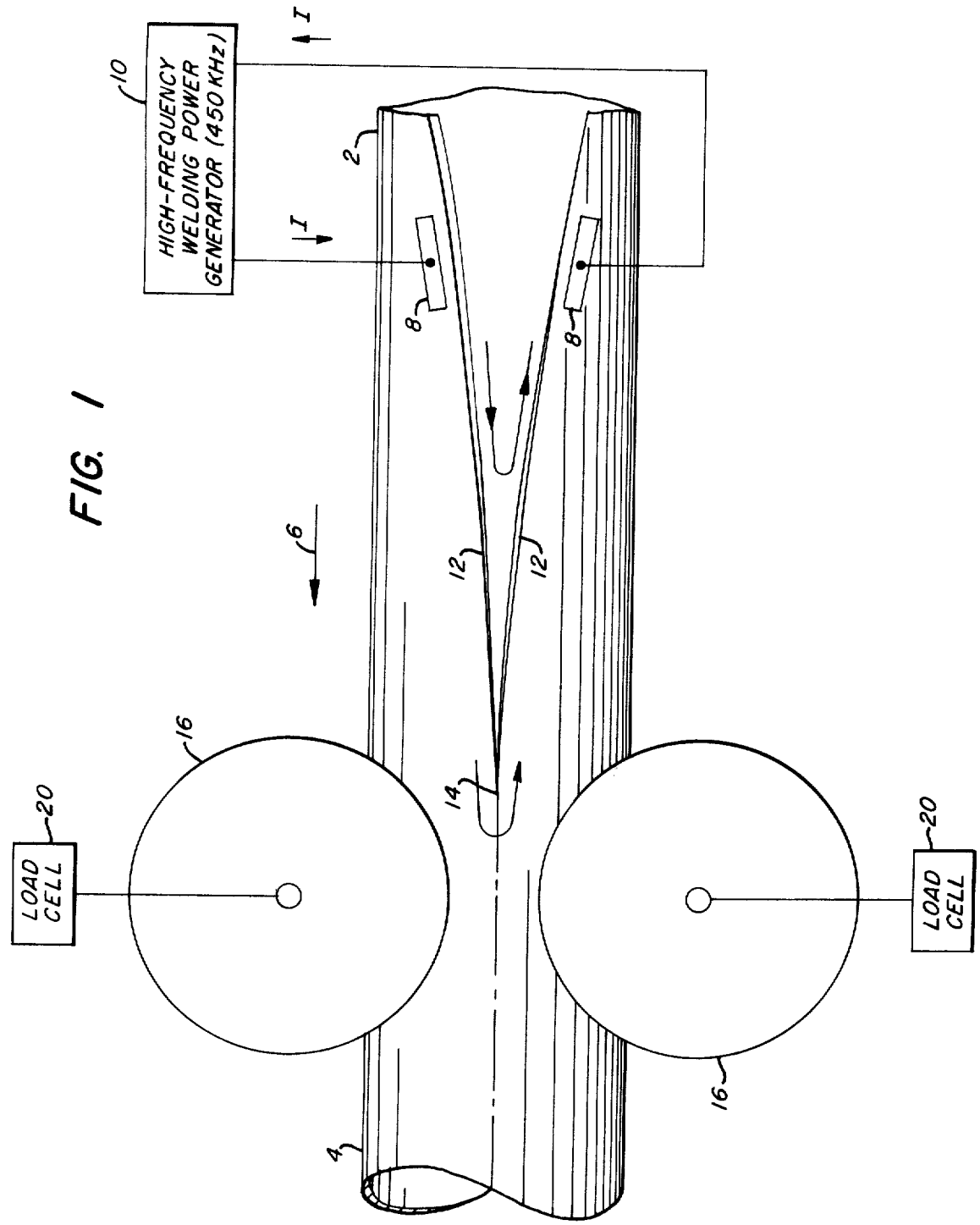

United States Patent [19]

Bowman et al.

[11] 3,899,651

[45] Aug. 12, 1975

[54] METHOD AND APPARATUS FOR CONTROL OF WELD TEMPERATURE IN A HIGH FREQUENCY ELECTRIC RESISTANCE WELDED PIPE MILL

[75] Inventors: Howard J. Bowman, Eustis, Fla.; Donald G. Schindler, Pittsburgh, Pa.

[73] Assignee: United States Steel Corporation, Pittsburgh, Pa.

[22] Filed: Oct. 11, 1973

[21] Appl. No.: 405,369

[52] U.S. Cl. ................................. 219/67; 219/59
[51] Int. Cl. ............................................ B23k 31/06
[58] Field of Search ............................ 219/59, 67

[56] References Cited
UNITED STATES PATENTS

| | | | |
|---|---|---|---|
| 3,548,141 | 12/1970 | Remus | 219/67 X |
| 3,573,416 | 4/1971 | Dreschsler | 219/59 X |

*Primary Examiner*—C. L. Albritton
*Assistant Examiner*—N. D. Herkamp
*Attorney, Agent, or Firm*—Rea C. Helm

[57] ABSTRACT

A system for control of the welding temperature in a high frequency electric resistance weld pipe mill utilizes wall thickness, speed and weld current as input parameters in a control circuit based on the thermal power necessary to heat the skelp to the desired temperature. The control circuit includes adjustments for changes in dynamic forging forces.

15 Claims, 5 Drawing Figures

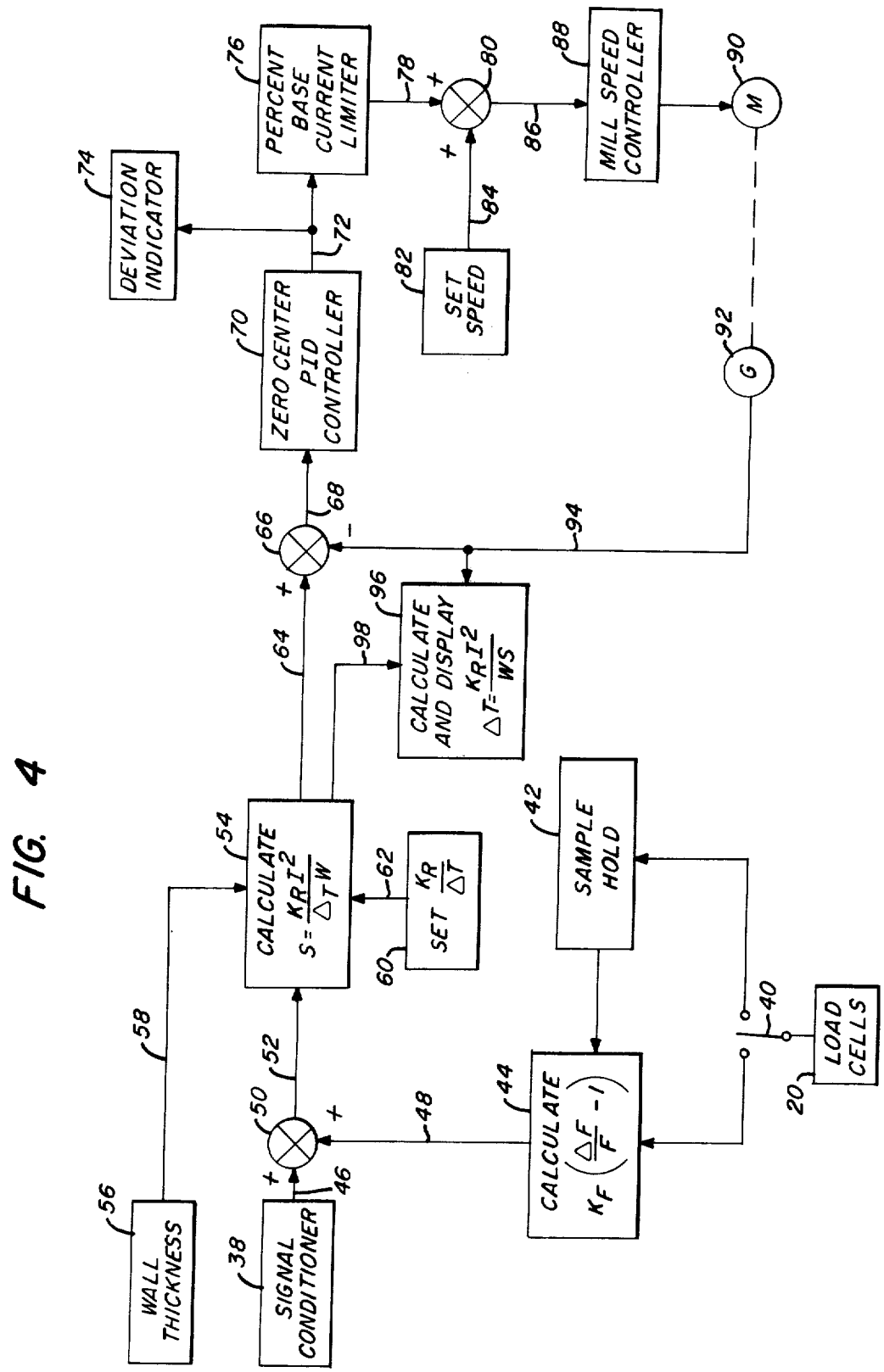

METHOD AND APPARATUS FOR CONTROL OF WELD TEMPERATURE IN A HIGH FREQUENCY ELECTRIC RESISTANCE WELDED PIPE MILL

This invention relates to a method and apparatus for control of the welding temperature in a high frequency electric resistance weld pipe mill and more particularly to a method and apparatus for controlling the welding by measurement of the parameters in the welding process, displaying the parameters and using the parameters in a closed loop control system to control the welding temperature.

In the electric resistance weld (ERW) process of steel pipe manufacturing, high frequency, for example 450 Khz, currents are introduced by sliding contact electrodes on the body of skelp, which has been formed into an unwelded tubular shape, to heat the edges to welding temperature. A short distance from these electrodes the weld pressure rolls exert forging pressures on the edges of the heated skelp to form the final welded pipe. At such current frequencies as are commonly used, the current travels predominately on the edges of the skelp and by means of resistance heating raises the temperature of the edges to welding temperature as the skelp continuously moves under the electrodes and to the forging rolls.

ERW mills are not usually provided with indicators for the indication of weld temperature of the magnitude of the welding currents and voltages. Meters are provided to indicate the direct current and plate voltage operating points of the oscillator tubes which generate the higher frequency welding current, but the meters are of value only in establishing initial conditions and offer little insight into actual welding conditions. The weld mill operator adjusts the plate voltage or mill speed to set the required heat in the welding zone. The heat is set by visual observation of the edges of the skelp or of the color of the weld bead upset material squeezed out at the forging rolls during the welding action or of both.

Attempts to determine the weld point temperature directly by the use of radiation pyrometers have been largely unsuccessful because of the steam, oil vapors and emissivity variations occurring at the apex of the vee. More importantly, only the tops of the heated skelp edges can be sensed by radiation pyrometers and this does not provide accurate readings of the temperature of the faces of the skelp. Because the high frequency current density at sharp corners is generally higher than on flat surfaces, the corners of the skelp edge are at a higher temperature than the faces of the skelp edge. When viewing some part of the edge from a downstream angle with a radiation pyrometer, it is possible to measure the face temperature of some part of the skelp edge but the accuracy is affected by the difficulties already mentioned. In addition this technique does not accurately indicate the temperature of the apex which moves back and forth under dynamic welding conditions and which causes temperature variations due to this dynamic vee length change.

Since a proper combination of the heat applied to the welding vee and the upset forging force is required to make good welds, it is obviously desirable to control weld temperature. Good welding implies not only the mechanical properties but also the quality of the weld, insofar as the weld is free of the various discontinuities that can occur with this welding technique. Proper control of the heat and upset forces can markedly reduce the incidence of weld discontinuities and aids in control of the material flow lines in the fusion area.

Studies and experiments on the ERW process disclosed that the mass of steel per unit time in the heating zone, if all other factors such as mill speed, power input and wall thickness are held constant, determines the heat input to the steel and the resultant temperature of the steel at the weld point. The mass of the material per unit time in the vee is directly proportioned to the volume of the heated strip between the electrodes supplying high frequency power for heating and the apex of the vee or the squeeze point located somewhere between the final pressure rolls where the vee is formed. For a relatively constant oscillator frequency supplying power for heating, the depth of penetration of the high frequency current into the body of the pipe is essentially constant for a given grade of material within chemistry variations allowed, therefore the volume to be heated is proportional to wall thickness and length of the vee or the heating zone. For a nominally constant wall thickness the length of the vee or heating zone is the determining factor in heat dissipation and the weld point temperature. The dynamic length of the vee, if all other factors are held constant, determines the temperature at the weld point and conversely may be a function of the temperature at the welding point. Weld pressure variations and certain pipe forming situations also alter the length of the vee and thus the final welding temperature.

For the purposes of our method of control, these relationships may be expressed mathematically using the classical heating relation of the thermal power necessary to heat a mass a given amount as $$TP = K Mc\Delta T \tag{1}$$

where
$TP$ is the thermal power in watts,
$K$ is a constant,
$M$ is the mass of material to be heated in pounds per minute,
c is the specific heat of the material, and
$\Delta T$ is the temperature rise in the material in °F The thermal power is determined from the high frequency welding current as $$TP = I^2 R \tag{2}$$

where
$I$ is the high freqency welding current, and
$R$ is a resistance representative of the vee.

The resistance R may be considered as made up of two resistances in parallel, the resistance along the vee and the resistance around the tube wall. The first resistance may be expressed as $$R_r = \frac{\rho_T \Delta L}{w\delta} \tag{3}$$

where
$R_r$ is the resistance along the vee,
$\rho_t$ is the resistivity at the desired temperature,
$\Delta L$ is the vee length, the distance along an edge of the skelp between the current contact and the location where the two edges meet, $N$ is the thickness of the tube wall material and
$\delta$ is the depth of current penetration The resistance around the tube wall may be expressed as $$R_w = \frac{\rho D}{W \Delta L} \quad (4)$$

where
$R_w$ is the resistance around the tube wall,
$\rho$ is the resistivity at room temperature and
$D$ is the tube circumference, the skelp width This is an adequate approximation for high frequency current flow on large diameter pipe and also where impedors are used to minimize the current flow around the tube wall on small diameter pipe.

If equations (3) and (4) are combined algebraically, the resistance R then becomes $$\frac{\rho_t \rho \Delta L D}{W(\Delta L^2 \rho_t + \rho D \delta)} \quad (5)$$

The relationship between the resistivity at room temperature and the resistivity at the desired temperature may be adequately approximated by a generally linear relationship as follows:

$$\rho_t = k_1 \rho \quad (5)$$

where $k_1$ is a constant.

If equation (5) is combined with the expression above for R, the expression for R then becomes:

$$\frac{k_1 \rho \Delta L D}{W(k_1 \Delta L^2 + D\delta)} \quad (6)$$

In order to simplify this expression for R, recognition may be given to fixed and preselected parameters. In the expression within the parentheses above, $k_1$ is a constant, $\delta$ is fixed for a given frequency and $\Delta L$ and $D$ are fixed for a specific pipe size and welding machine configuration which is also fixed for a specific pipe size. Therefore, the following approximation may be made $$\Delta L^2 = k_2 D \delta \quad (6)$$

where $k_2$ is a constant.

If equation (6) is combined with the expression above for R, then the two resistances in parallel may be written as:

$$R = \frac{\rho D}{W \Delta L} \times \frac{k_1 k_2}{k_1 k_2 + 1} \quad (7)$$

Combining equations 1, 2 and 7 while considering that $$M = W \delta S \quad (8)$$

where $S$ is the speed of the pipe provides the following three factor expression;

$$\Delta T = \frac{I^2}{WS} \times \frac{D\left(\frac{k_1 k_2}{k_1 k_2 + 1}\right)}{W \Delta L} \times f(k, \rho, c, \delta) \quad (9)$$

where
$f(K, \rho, c, \delta)$ is function of material in terms of resistivity, specific heat, depth of current penetration in the body of pipe and $K$ is the constant from equation (1).

The second factor, $$\frac{D\left(\frac{k_1 k_2}{k_1 k_2 + 1}\right)}{W \Delta L},$$

of equation (7) represents the static conditions of diameter-to-wall ratio and vee length that determine roll sizes, shapes and openings to properly shape the pipe and are not varied in the process. The third factor, $f(K, \rho, c, \delta)$ represents metallurgical and thermodynamic contributions that are second order variables for which no dynamic measurement is practical. Accordingly only the first factor, $I^2/WS$ is used for controlling welding.

The first factor, $I^2/WS$ has been found to be sensitive to the dynamic vee length changes that occur in welding in that as the vee length increases the high frequency heating current decreases which decreases the welding temperature and as the vee length decreases the current and temperature increase. For a fixed vee length the welding current increases and decreases to increase and decrease the welding temperature. Thus the $I^2/WS$ term has been found to measure those changes which alter the weld temperature when, all pertinent parameters are included by including the second and third factors of equation (9) into a proportionality constant related to resistance, $K_R$.

There are occasions however, when hardness of material along the coil length, and thus resistivity, changes sufficient to require consideration in welding control. These changes may be determined from measurement of the forces exerted on the welding pressure rolls, and is a partial recognition of the third factor of equation (9). Static force changes have been measured and found to have little effect on the resultant temperature of the weld except for large changes which affect the length of the vee. Dynamic changes of force levels during a production run indicate hardness changes and forming problems both of which affect the temperature of the weld. Therefore a ratio of dynamic to static force levels can be used to indicate mechanical and material changes that alter weld temperature. Accordingly equation (9) may be rewritten as $$\Delta T = K_R \frac{I^2}{WS} + K_F \left(\frac{\Delta F}{F}\right)$$

where
$K_R$ is the constant related to resistance,
$K_F$ is a constant related to force,
$\Delta F$ is the dynamic force level and
$F$ is the static force level
The value of $K_F$ must be empirically determined.

Equation (10) indicates that a linear relationship between $\Delta T$ and $\Delta F/F$ is satisfactory for control purposes.

Actual measurements are made and the resulting data displayed graphically to determine the slope, $K_F$, of a straight line approximation of the relationship between $\Delta T$ and $\Delta F/F$. Measurements are made over a normal range of operating experience to yield sufficient data. Equations (1) and (2) indicate that $I$ may be used as a measure of $\Delta T$. Load cells may be used to measure forging forces. Other factors that effect the welding process must be considered in making the measurements. Current frequency, $\Delta L$ and $S$ are normally fixed for a welding machine while $\delta$, $c$, and $\rho$ are factors fixed for each grade of steel. A value for W and D will be adequate for wall thicknesses and diameters (0.125 inches to 0.487 inches and 6 inches to 20 inches) commonly formed by the ERW process. For smaller diameters and thinner walls the value of $K_F$ must reflect the increased sensitivity of the welding temperature to the forging force and the dynamic changes which directly reflect the temperature of the weld.

It is therefore an object of our invention to provide a method of controlling the welding temperature in the electric resistance welding process for manufacture of welded pipe.

Another object is to provide such a control method based on welding current.

Another object is to provide such a method based on mill speed.

Still another object of my invention is to provide an apparatus for controlling the welding process in the electric resistance welding method of manufacturing welded pipe.

Figure 3:
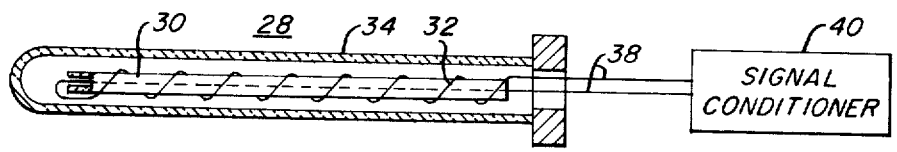
Figure 2:
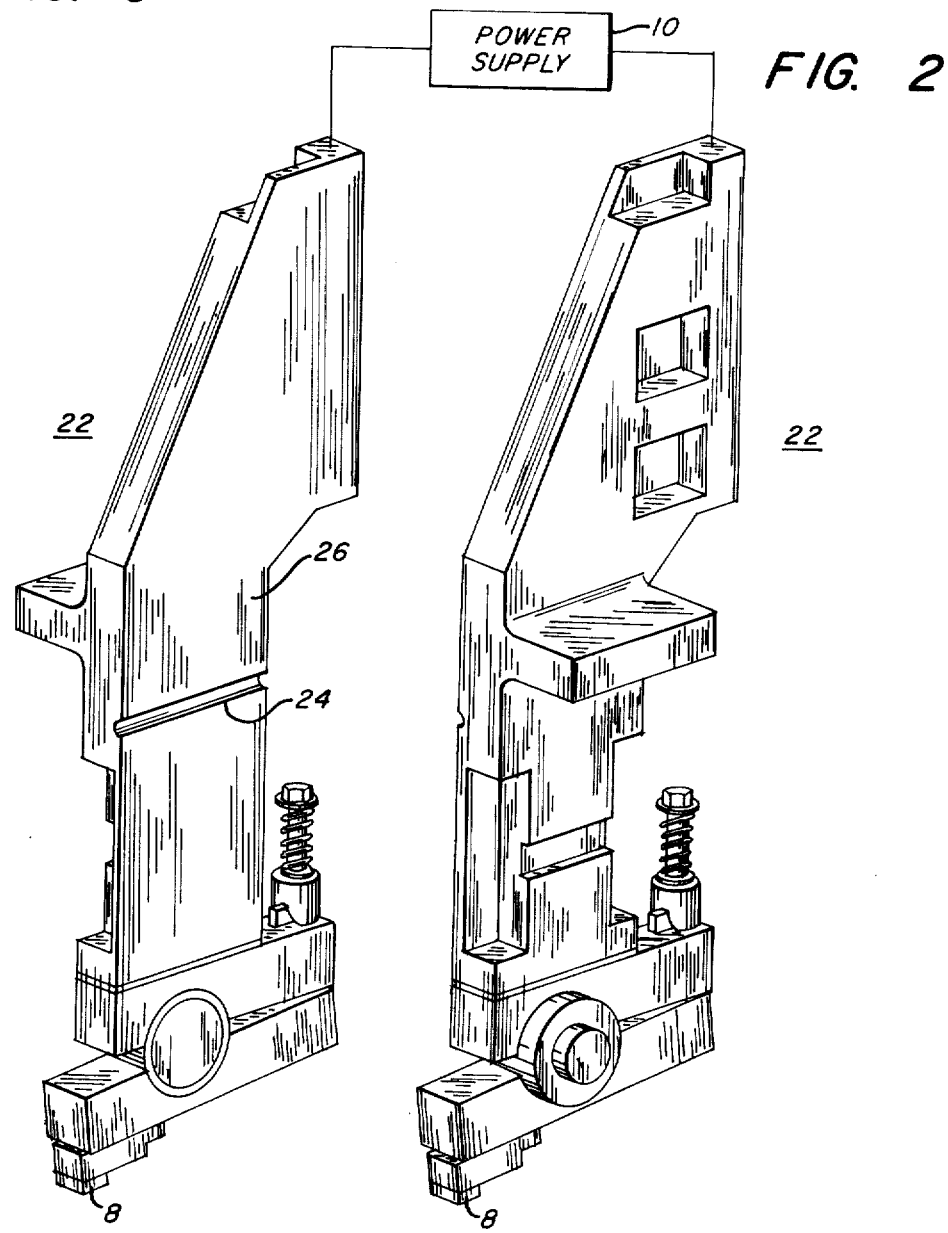
Figure 5:
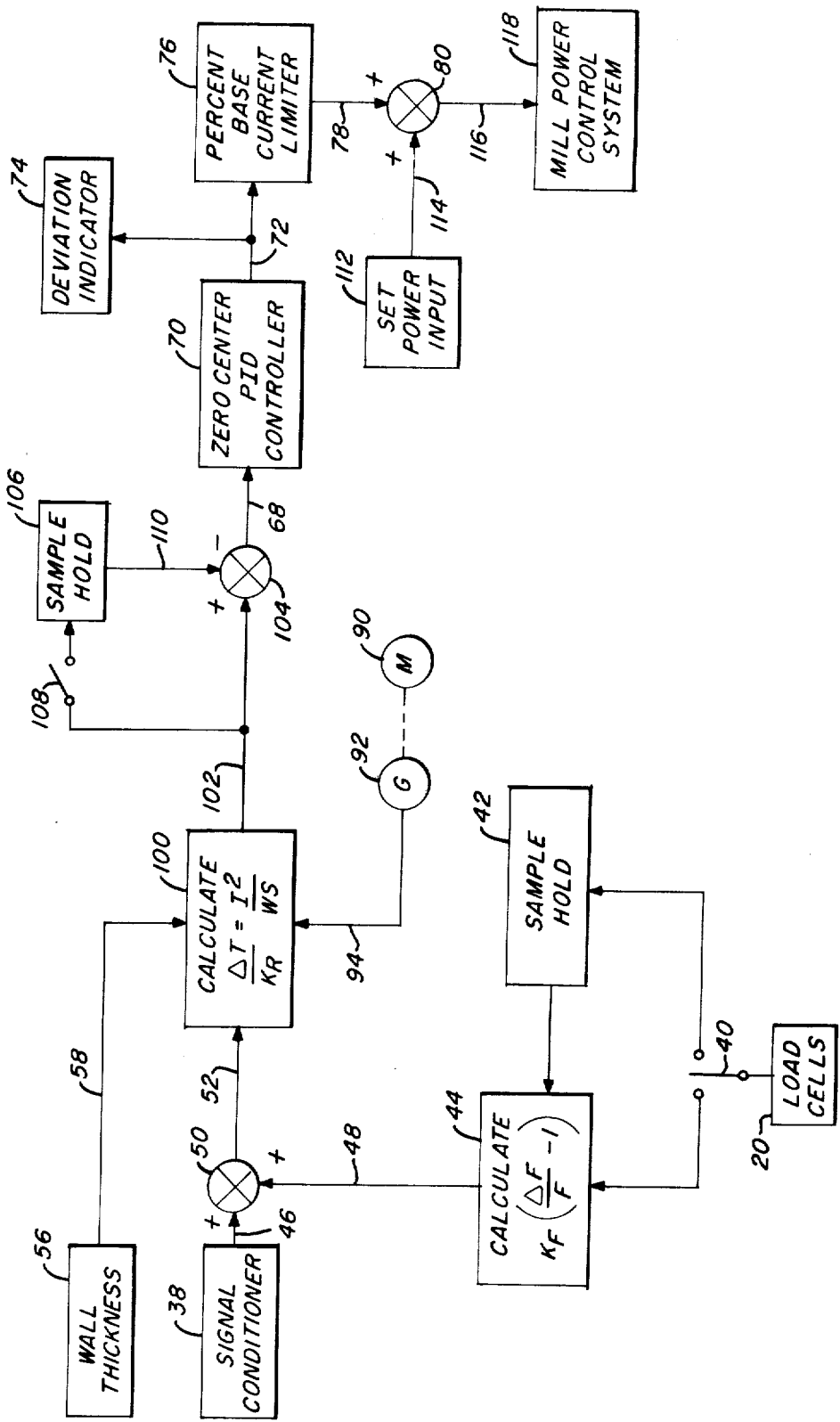

These and other objects will become more apparent after referring to the following specification and drawings in which:

FIG. 1 is a schematic diagram of the essential elements in the electric resistance welding method for manufacturing welded pipe, FIG. 2 is a perspective view of the conductor lead assemblies used in the process, FIG. 3 is a sketch, partially in section of the current sensor used to determine welding current, FIG. 4 is a block diagram of the control circuit of one embodiment of our invention and FIG. 5 is a block diagram of the control circuit of a second embodiment of our invention.

Referring now to FIG. 1, reference numeral 2 indicates part of a length of skelp being formed into pipe 4 by motion in direction of the arrow 6. Contact electrodes 8 are connected to a high frequency power source 10 to provide a heating current I along edges 12 of the welding vee and through the vee apex 14. Forging rolls 16 close the skelp to form the finished weld 18 beginning at the vee apex and together with forming rolls (not shown) drive the material through the mill. Load cells 20 measure the forging force exerted by rolls 16. This is a conventional electric resistance weld mill.

FIG. 2 shows the two conductor lead assemblies shown generally at 22. The top of each lead is connected to power supply 10 and the bottom of each assembly includes the contact electrode 8. A slot 24 is machined in the inner face 26 of one of the conductor assemblies 22. A current sensor, shown generally as 28 in FIG. 3 is placed in slot 24 and is generally about as long as the slot.

Sensor 28 has a hollow alumina core 30. Wrapped around core 30 are approximately 10 turns of litz wire, 32, consisting of five stranded copper wires each insulated to minimize eddy current heating in the intense magnetic field caused by the 450 Khz current in the range of 400 to 600 amperes flowing through the conductor assembly. A heat resistant glass tube 34 is placed around the core and wire and the ends 36 are connected to a signal conditioner 38. Signal conditioner 38 is a conventional circuit for converting the signal developed by the sensor to a signal compatible with the other components of the control circuit hereinafter described.

Referring now to the embodiment shown in FIG. 4 which includes several conventional electronic circuits designed for performing the described functions, load cells 20, as described in FIG. 1, provide a forging force signal through a switch 40 to a sample and hold circuit 42. Switch 40 and an output of circuit 42 are connected to a divider, subtractor and adjustable gain circuit 44. An output 46 of signal conditioner 38 as described in FIG. 3 and an output 48 of circuit 44 are connected as inputs to an operational amplifier summer 50. An output 52 of summer 50 is connected to a first input of a multiplying and dividing circuit 54. A signal source 56 for a wall thickness signal 58 is connected to a second input of circuit 54. A signal source 60 for a signal representative of $K_R/\Delta T$
62 is connected to a third input to circuit 54.

Circuit 54 has an output signal 64 representative of the desired mill speed connected to a first input of an operational amplifier summer circuit 66. Circuit 66 has an output signal 68 connected to the input of a proportional integral derivative controller circuit 70 having a zero center output. Circuit 70 has an output 72 connected to a deviation detector 74 which indicates the magnitude and direction of output 72 of circuit 70. Output 76 is also connected to an input of a limiter circuit 76. Limiter circuit 76 has an output 78 connected to a first input of an operational amplifier summer circuit 80. A signal source 82 for a base mill speed signal has an output 84 connected to a second input of circuit 80.

Circuit 80 has an output 86 connected to a conventional mill drive control 88 which controls the speed of the mill drive motor 90. Motor 90 is mechanically connected to drive a tachometer generator 92 which provides an output signal 94 connected to a second input of circuit 66. Signal 94 is also connected to a first input of a multiplier-divider circuit 96 which includes a digital voltmeter to display a number representative of $\Delta T$. Circuit 96 has a second input 98 from circuit 54 to supply signals representative of $^KR$, $I^2$ and W.

In operation switch 40 is moved to the right to connect the load cells 20 to circuit 42 while the mill is at rest to provide F, the static forging force. Once the mill is in operation, switch 40 is moved to the left and the load cells then supply the dynamic forging force $\Delta F$. The static level may be changed as mill production schedule varies in grades and sizes of pipe. The gain of circuit 44 is adjusted to provide input $K_F$ which is empirically determined. It is obvious that the $K_F$ described here and elsewhere to provide signal 48 may be a modification of the $K_F$ described in equation (10) because of the algebraic formula shown on the drawings for circuit 44. Signal conditioner 38 converts the output of sensor 28 which is proportioned to the welding current, to a signal 46 to be compatible with the other electronic components of the system. Signal 48 compensates for changes in forging force by modifying signal 46 to provide signal 52 which is the signal used for I in circuit 54.

Circuit 56 may be a potentiometer providing a signal representative of the wall thickness or more accurately it may be an actual thickness signal from a thickness gage. Signal 62 is supplied to circuit 60 which may be a potentiometer set to reflect $K_R$ which is empirically determined and the desired welding temperature in $\Delta T$. Circuit 54 then calculates the desired speed signal 64 as shown in the equation. This equation is not identical to equation 10, but is more convenient to handle than the exact circuitry of equation 10 and yields comparable results with adjustments to $K_F$ and $K_R$.

The desired speed signal 64 and the actual speed signal 94 are compared to provide a difference signal 68 to controller 70. Controller 70 provides an output 72 which is negative when signal 52 decreases indicating a decrease in welding temperature and which is positive when signal 52 increases to indicate a rise in welding temperature thus necessitating an increase in mill speed. Signal 72 is scaled in circuit 76 to represent a required percentage of the base speed signal 84 which is set by the mill operator so that signal 78 controls over a limited range of the base determined from practice in terms of the signal 52 deviations that occur. The mill operator may at any time insert a new speed base signal 84 or vary the limits in circuit 76 as experience and practice require for various grades and sizes of pipe or as quality control reports on weld quality indicates. Circuit 76 may for example be set for plus or minus 10% of the base speed, and if deviation indicator 74 indicates a deviation beyond that range, it is an indication to the operator that manual control is required. Signal 78 is combined with signal 84 to provide signal 86 to actually control mill speed through a conventional mill speed controller 88. A tachometer generator 92 connected to the mill motor provides the actual speed signal 94.

Circuit 96 includes a digital voltmeter to display $\Delta T$ performing the calculation as shown with I and W from circuit 54, S from tachometer generator 92 and $K_R$ from an internal potentiometer.

In the event the operation provides little or no changes in the dynamic forging force from the static force the signal 48 need not be provided and signal 46 connected directly to circuit 54. However, in that case, it may be desirable to provide a fixed signal 48 and simply monitor the output of load cells 20 and to vary the pressure when the monitor indicates the pressure is not in a desired range.

The control system enables the operator to leave the normal work station at the welder and track end welds thru the equipment. Previous material changes that were sometimes difficult to detect are now readily determined. Changes in welding that even the most experienced operator could not detect from the color of the weld can now be detected by instruments and with the control system. Use of the control system has improved both yield and quality. The controller also automatically compensates for welding current problems caused by camber in the strip creating ripples in the edges of the strip with respect to each other.

Referring now to the embodiment shown in FIG. 5, signals 52, 58 and 94 are the same signals as shown in the embodiment of FIG. 4 and are provided in the same manner by the same equipment and numbered in the same manner as in FIG. 4.

Reference numeral 100 is a multiplying and dividing circuit having inputs 52, 58 and 94 and an output signal 102 representative of the desired welding temperature expressed as $\Delta T/K_R$. Output 102 is connected to a first input of an operational amplifier summer circuit 104 and to a sample and hold circuit 106 through a switch 108. Circuit 106 has an output 110 connected to a second input of circuit 104. Circuit 104 has an output 68 connected to an input of a controller circuit 70. Circuit 70 has an output 72 connected to an input of a deviation indicator 74 and an input of a percent base current limiter circuit 76. Circuit 76 has an output 78 connected to a first input of an operational amplifier summer circuit 80. The parts just described from reference numerals 68 through 80 are the same as shown in FIG. 4.

A signal source 112 for a base power input has an output 114 connected to a second input of circuit 80. Circuit 80 has an output 116 connected to an input of a conventional mill power control system 118 for the high frequency electric resistance weld pipe mill.

The embodiment of FIG. 5 operates in a similar manner as the embodiment of FIG. 4 but operates on a different parameter. Circuit 100 calculates a signal 102 representative of the desired temperature which is compared with a desired temperature by use of the sample hold circuit 106 and the difference signal 68 operates controller 70. The desired temperature signal is entered into circuit 106 by closing switch 108 at the desired level of signal 102. The control signal 78 is used to vary the current from the power supply within limits set by circuit 76. As in the embodiment of FIG. 4, dynamic forging force considerations may be eliminated from the control system.

Either speed (FIG. 4) or power (FIG. 5) may be the controlling parameter in our control system. Each embodiment does however compensate for changes in the parameter now used for controlling so that the control system accurately reflects variations in parameters during the process. Using speed as the controlling parameter is preferred for maximum throughput of a mill, using weld power for control has the advantages of not overloading the power supply thus minimizing potential damage to components and providing a larger variable range for control.

While two embodiments of my invention have been shown and described, it is obvious that the control equation may be modified for use in other combinations.

We claim:

1. A method of controlling the welding temperature in a high frequency electric resistance welded pipe mill comprising the steps of selecting a control factor, for which an actual value will be compared to a desired value for control purposes, from the equation $$\Delta T = \frac{K_R I^2}{WS}$$

where $\Delta T$ is the temperature rise of the material being welded, $K_R$ is a constant, $I$ is the weld power current, $W$ is the wall thickness of the pipe and $S$ is the mill speed, continuously measuring mill control parameters $I$ and $S$, continuously providing a signal representative of wall thickness, continuously calculating one value of said factor using said equation with the measured value of $I$, the wall thickness signal and a value for the remaining factor in the equation, continuously providing a difference signal by comparing said one value of said control factor with the other value of said factor selecting one of said mill control parameters, and continuously varying said mill control parameter in accordance with said difference signal.

2. A method according to claim 1 in which the control factor is $S$, the remaining factor and its value is the desired value of $K_R/\Delta T$ and the mill control parameter is $S$.

3. A method according to claim 1 in which the control factor is $\Delta T/K_R$, the remaining factor and its value is the actual value of $S$ and the mill control parameter is $I$.

4. A method according to claim 1 which includes the steps of measuring the static force exerted by the forging rolls, continuously measuring the dynamic force exerted by the forging rolls and continuously calculating and applying a correction to the weld power current for calculation purposes from said measurements of static and dynamic forces.

5. A method according to claim 1 in which the step of varying said mill control parameter includes the steps of continuously converting said difference signal to a zero center control signal for varying said mill control parameter, and continuously limiting the magnitude of said zero center control signal to a predetermined level above zero and a predetermined level below zero.

6. A method according to claim 1 which includes the step of providing a signal representative of a desired forging force for calculating said one value of said factor.

7. A method according to claim 6 which includes the steps of monitoring the value of the forging force and adjusting the forging force to a value within a desired range when the value is outside the desired range.

8. Apparatus for controlling the welding temperature in a high frequency electric resistance welded pipe mill comprising:

means for calculating a desired mill speed according to the equation $$S = \frac{K_R I^2}{\Delta T W}$$

where $S$ is the desired mill speed, $I$ is the weld power current, $W$ is the wall thickness, $K_R$ is a constant and $\Delta T$ is the desired temperature rise of the material being welded, means connected to said calculating means for providing a signal representative of the actual wall thickness, means connected to said calculating means for providing a signal representative of the actual weld power current, means connected to said calculating means for providing a signal representing $K_R/\Delta T$ means connected to said mill for providing a signal representative of the actual mill speed, means connected to said calculating means and said means for providing an actual mill speed signal for comparing the actual mill speed with the desired mill speed, and means connected to said means for comparing and to the mill drive motor and responsive to the comparison of said signals for varying the speed of the mill drive motor.

9. Apparatus according to claim 8 in which the means for providing a signal representative of the actual weld power current includes a conductor assembly connected to the weld power supply, a current sensor located in a slot along a face of said assembly, said sensor having a ceramic core, a winding of litz wire wrapped around said core and a protective glass tube surrounding said winding and said core and signal conditioning means connected to said winding for providing a current signal compatible with said calculating means.

10. Apparatus according to claim 8 in which said means for varying the speed of the mill drive motor includes means for limiting the variation in speed a predetermined amount below and a predetermined amount above a set mill speed in response to said comparison.

11. Apparatus according to claim 8 which includes means for measuring the static force exerted by the measuring rolls, means for measuring the dynamic force exerted by the forging rolls, means connected to said force measuring means for comparing the static and the dynamic forces and means connected to said means for comparing, said means for providing a current signal and said calculating means and responsive to said comparison for providing an adjusted current signal to said calculating means.

12. Apparatus for controlling the welding temperature in a high frequency electric resistance welded pipe mill comprising means for calculating according to the equation $$\frac{\Delta T}{K_R} = \frac{I^2}{WS}$$

a desired value of $\Delta T/K_R$ where $\Delta T$ is the actual temperature rise of the material being welded, $K_R$ is a constant, $I$ is the weld power current, $W$ is the wall thickness and $S$ is the actual mill speed, means connected to said calculating means for providing a signal representative of the actual wall thickness, means connected to said calculating means for providing a signal representative of the actual weld power current, means connected to said calculating means and to said mill for providing a signal representative of the actual mill speed, means for providing a signal representative of $\Delta T/K_R$ where $K_R$ is said constant and $\Delta T$ is the desired temperature rise of the material being welded, means connected to said calculating means and said means for providing a signal representative of a desired temperature rise divided by $K_R$ for comparing the actual $\Delta T/K_R$
signal with the desired $\Delta T/K_R$
signal, and
means connected to said comparing means and to the weld current power supply and responsive to the comparison of said signals for varying the weld power current.

13. Apparatus according to claim 12 in which the means for providing a signal representative of the actual weld power current includes a conductor assembly connected to the weld power supply, a current sensor located in a slot along a face of said assembly, said sensor having a ceramic core, a winding of litz wire wrapped around said core and a protective glass tube surrounding said winding and said core and signal conditioning means connected to said winding for providing a current signal compatible with said calculating means.

14. Apparatus according to claim 12 in which said means for varying the weld power current includes means limiting the variation in weld power current a predetermined amount below a set weld power current level and a predetermined amount above a set weld power current level.

15. Apparatus according to claim 12 which includes means for measuring the static force exerted by the measuring rolls, means for measuring the dynamic force exerted by the forging rolls, means connected to said force measuring means for comparing the static and the dynamic forces and means connected to said means for comparing, said means for providing a current signal and said calculating means and responsive to said comparison for providing an adjusted current signal to said calculating means.

* * * * *

UNITED STATES PATENT OFFICE
CERTIFICATE OF CORRECTION

Patent No. 3,899,651　　　　Dated　August 12, 1975

Inventor(s)　Howard J. Bowman et al.

It is certified that error appears in the above-identified patent and that said Letters Patent are hereby corrected as shown below:

Column 1, line 27, "of", second occurrence, should read -- or --.

Column 2, line 58, in the equation, "Rr" should read -- Rv --.

Column 3, line 1, "N" should read -- W --.  Column 5, line 12, after "A" insert -- single --.  Column 8, line 39, "now" should read -- not --.

Signed and Sealed this twenty-first Day of October 1975

[SEAL]

Attest:

RUTH C. MASON
*Attesting Officer*

C. MARSHALL DANN
*Commissioner of Patents and Trademarks*